(12) United States Patent
Maruyama et al.

(10) Patent No.: US 8,810,193 B2
(45) Date of Patent: Aug. 19, 2014

(54) CHARGING APPARATUS HAVING GAS GENERATION DETECTOR AND CHARGING METHOD FOR THE SAME

(71) Applicants: Tomomi Maruyama, Konosu (JP); Eiji Saiki, Konosu (JP); Akitoshi Kato, Kawasaki (JP); Yoshihiro Honda, Tokorozawa (JP)

(72) Inventors: Tomomi Maruyama, Konosu (JP); Eiji Saiki, Konosu (JP); Akitoshi Kato, Kawasaki (JP); Yoshihiro Honda, Tokorozawa (JP)

(73) Assignees: Iwasaki Electric Co., Ltd., Tokyo (JP); Tokyo Rectifier Co., Ltd., Kawasaki-Shi (JP); JPS Co., Ltd., Tokorozawa-Shi (JP)

( * ) Notice: Subject to any disclaimer, the term of this patent is extended or adjusted under 35 U.S.C. 154(b) by 0 days.

(21) Appl. No.: 13/960,296

(22) Filed: Aug. 6, 2013

(65) Prior Publication Data
US 2013/0314033 A1    Nov. 28, 2013

Related U.S. Application Data

(62) Division of application No. 12/918,978, filed as application No. PCT/JP2009/000594 on Feb. 16, 2009, now Pat. No. 8,531,157.

(30) Foreign Application Priority Data

Feb. 25, 2008   (JP) .................... 2008-043467

(51) Int. Cl.
*H02J 7/00* (2006.01)
*H01M 10/52* (2006.01)

(52) U.S. Cl.
CPC .............. *H01M 10/52* (2013.01); *H02J 7/007* (2013.01)
USPC ........................ 320/107; 320/137; 320/147

(58) Field of Classification Search
USPC ........................................... 320/107
See application file for complete search history.

(56) References Cited

U.S. PATENT DOCUMENTS 3,867,199 A * 2/1975 Dunlop et al. ............. 429/101
4,371,825 A   2/1983 Chi et al.
(Continued)

FOREIGN PATENT DOCUMENTS

CN    1235277 A    11/1999
EP    0957560 A    11/1999
(Continued)

OTHER PUBLICATIONS

European Search Report mailed Aug. 12, 2013 for the corresponding European Patent Application No. 09716128.5.
(Continued)

*Primary Examiner* — Arun Williams
(74) *Attorney, Agent, or Firm* — Leason Ellis LLP.

(57) ABSTRACT

A charging apparatus for charging a cell group, in which a plurality of secondary cells are connected in series, by supplying a charging current Ic to the secondary cells is provided with an overcharge protection circuit including discharge route circuits 34 provided to each of the secondary cells and adapted to cause the secondary cells to discharge during charging by connecting the secondary cells to the discharge route circuits based on cell voltages Vb of the secondary cells or to stop discharging by cutting off the secondary cells from the discharge route circuits; and a charger controller for continuing charging while reducing the charging current Ic until the discharge of the secondary cell having started discharging to the discharge route circuit is stopped when the discharge of any one of the secondary cells to the discharge route circuit is started by the overcharge protection circuit.

5 Claims, 4 Drawing Sheets

(56) References Cited

U.S. PATENT DOCUMENTS

| | | | |
|---|---|---|---|
| 4,396,880 A * | 8/1983 | Windebank | 320/156 |
| 4,465,963 A * | 8/1984 | Iseard | 320/147 |
| 5,677,613 A | 10/1997 | Perelle | |
| 2004/0108837 A1 | 6/2004 | Lai et al. | |
| 2004/0135545 A1 | 7/2004 | Fowler et al. | |
| 2007/0212596 A1 * | 9/2007 | Nebrigic et al. | 429/61 |
| 2008/0297116 A1 | 12/2008 | Odaohhara et al. | |
| 2009/0153358 A1 * | 6/2009 | Park et al. | 340/870.39 |

FOREIGN PATENT DOCUMENTS

| | | |
|---|---|---|
| JP | 07-3251 | 1/1995 |
| JP | 07-264780 | 10/1995 |
| JP | 10-050352 | 2/1998 |
| JP | 11-329510 | 11/1999 |
| JP | 2000-014030 | 1/2000 |
| JP | 2001-268786 | 9/2001 |
| JP | 2003-087991 | 3/2003 |
| JP | 2007-318950 | 6/2007 |
| WO | WO-96/12333 | 4/1996 |

OTHER PUBLICATIONS

Office Action of the corresponding Chinese Application No. 200980106418.8 mailed Aug. 3, 2012.

Office Action issued Jan. 15, 2013 for the corresponding Chinese Patent Application No. 200980106418.8.

Office Action issued Mar. 18, 2014 for the corresponding European Application No. 09 716 128.5.

* cited by examiner

US 8,810,193 B2

CHARGING APPARATUS HAVING GAS GENERATION DETECTOR AND CHARGING METHOD FOR THE SAME

CROSS REFERENCE TO RELATED APPLICATION

This application is a Divisional of U.S. patent application Ser. No. 12/918,978filed Aug. 23, 2010, now issued as Patent No. 8,531,157, which is the U.S. national phase application under 35 U.S.C. sctn.371of International Patent Application No. PCT/JP2009/000594, filed Feb. 16, 2009, which claims the benefit of Japanese Patent Application No. 2008-043467, filed Feb. 25, 2008, all of which are incorporated herein by reference in their entirety. The International Application was published in Japanese on Sep. 3, 2009 as WO/2009/107335 A1 under PCT Article 21 (2).

FIELD OF THE INVENTION

The present invention relates to a charging apparatus and a charging method and particularly to a technique for improving charging efficiency.

BACKGROUND OF THE INVENTION

There have been conventionally known charging apparatuses for charging secondary cells multistage-connected in series.

For charging apparatuses of this type, a so-called multistage constant current charging method has been proposed which reduces influence of internal resistances of secondary cells and enables charging up to a state closer to full charge by charging the secondary cells with a specified constant current until voltages thereof reach a specified voltage and, thereafter, charging them with a current having a smaller value (for example, see Patent Document 1).

There is also known a charging apparatus including an overcharge protection circuit for preventing secondary cells from being overcharged. The overcharge protection circuit of this type includes discharge route circuits each including a discharge resistor and arranged in parallel in respective secondary cells and, if overcharge of any one of the secondary cells is detected, the secondary cell detected to be overcharged is connected to the discharge route circuit and forced to discharge and a charging current flowing into this secondary cell is bypassed to the discharge route circuit (for example, see, Patent Document 2).

Incorporation of this overcharge protection circuit into the charging apparatus brings about the following advantages in addition to protection against overcharge. Namely, in the case of charging secondary cells, which are difficult to produce while satisfying characteristics such as internal resistance values during charging periods, such as lithium polymer batteries connected in series at multiple stages, the overcharge protection circuit functions as a balancing circuit for balancing cell voltages among the respective secondary cells to align them with a fixed upper limit value. Thus, it is possible to charge the secondary cells while compensating for characteristic variations among the secondary cells. Also in the case of charging such secondary cells that cell voltages (internal resistances) during charging periods largely vary due to aged deterioration, the upper limit value of the cell voltages is kept constant regardless of the internal resistances of the secondary cells during a charging period at the start of use and during a charging period after a certain degree of aged deterioration. Thus, charging compensating for aged deterioration is possible.

Patent Document 1: JP-A-2003-87991
Patent Document 2: JP-A-H10-50352

SUMMARY OF INVENTION

Technical Problem

However, if the charging apparatus includes the overcharge protection circuit, the secondary cells are successively connected with the discharge route circuits for discharge from the one whose cell voltage is closest to a full charge voltage, for example, when the secondary cells are charged up to states close to the fully charged state using the technique disclosed in the above Patent Document 1. This presents a problem that charging power is wasted by the discharge of the discharge route circuits to reduce charging efficiency. Further, if discharge in the discharge route circuits is frequently carried out, there is also a problem that peripheral components are deteriorated by heat generated by the discharge of the discharge route circuits.

These kinds of problems similarly occur not only in the charging apparatus including the overcharge protection circuit, but also in the secondary cells that produce gas due to heat generation by charging.

Namely, similar to the waste of charging power due to discharge of the overcharge protection circuits to the discharge route circuits, charging power is wasted as a result of heat generation due to an increase in the internal resistances of the secondary cells or another reason and charging efficiency is reduced in a state where gas is generated in the secondary cells during charging. Further, the problem that peripheral components are deteriorated by heat generation also similarly occurs.

The present invention has been implemented in view of the above situation and an object thereof is to provide a charging apparatus and a charging method capable of suppressing the waste of charging power during charging periods and improving charging efficiency.

Solution to Problem

In order to accomplish the above object, the present invention is directed to a charging apparatus for charging a cell group, in which a plurality of secondary cells are connected in series, by supplying a charging current to the cell group, comprising an overcharge protection circuit including discharge route circuits provided to each of the secondary cells and adapted to cause the secondary cells being charged to discharge by connecting the secondary cells to the discharge route circuits based on cell voltages of the secondary cells or to stop discharging by cutting off the secondary cells from the discharge route circuits; and a charging control means for continuing charging while reducing the charging current until the discharge of the secondary cell having started discharging to the discharge route circuit is stopped when the discharge of any one of the secondary cells to the discharge route circuit is started by the overcharge protection circuit.

Further, in order to accomplish the above object, the present invention is directed to a charging apparatus for charging a cell group, in which a plurality of secondary cells are connected in series, by supplying a charging current to the cell group, comprising a gas generation detection means for detecting gas generation from any one of the secondary cells while the cell group is being charged; and a charging control means for continuing charging while reducing the charging current until the gas generation is stopped when the gas generation is detected by the gas generation detection means.

In any one of the above charging apparatuses of the present invention, the charging control means continues supply to the cell group while maintaining the charging current at a specified lower limit current value when the charging current falls below the specified lower limit current value while stopping charging when a voltage of the cell group reaches a specified charge end voltage.

Any one of the above charging apparatuses of the present invention further comprises a charger for supplying external power to a parallel circuit, in which the cell group and an external load are connected in parallel, charging the cell group and supplying power to the external load, and a voltage applied to the parallel circuit by the charger is controlled to maintain the charging current flowing into the cell group substantially at zero during non-charging periods while the cell group and the external load are maintained in an electrically conductive state.

Further, in order to accomplish the above object, the present invention is directed to a charging method for charging a cell group, in which a plurality of secondary cells are connected in series, by supplying a charging current to the cell group, comprising the steps of causing the secondary cells being charged to discharge by connecting them to discharge route circuits provided to the respective secondary cells based on cell voltages of the secondary cells or to stop discharging by cutting off the secondary cells from the discharge route circuits; and continuing charging while reducing the charging current until the discharge of the secondary cell having started discharging to the discharge route circuit is stopped if the discharge of any one of the secondary cells to the discharge route circuit is started.

Furthermore, in order to accomplish the above object, the present invention is directed to a charging method for charging a cell group, in which a plurality of secondary cells are connected in series, by supplying a charging current to the cell group, comprising the step of continuing charging while reducing the charging current until gas generation is stopped when the gas generation from any one of the secondary cells is detected while the cell group is being charged.

Advantageous Effects of Invention

According to the present invention, it is possible to suppress the waste of charging power accompanying discharge or gas generation and improve charging efficiency since secondary cells are charged while a charging current is so reduced as to stop discharge to discharge route circuits or gas generation from the secondary cells during charging.

Figure 1:
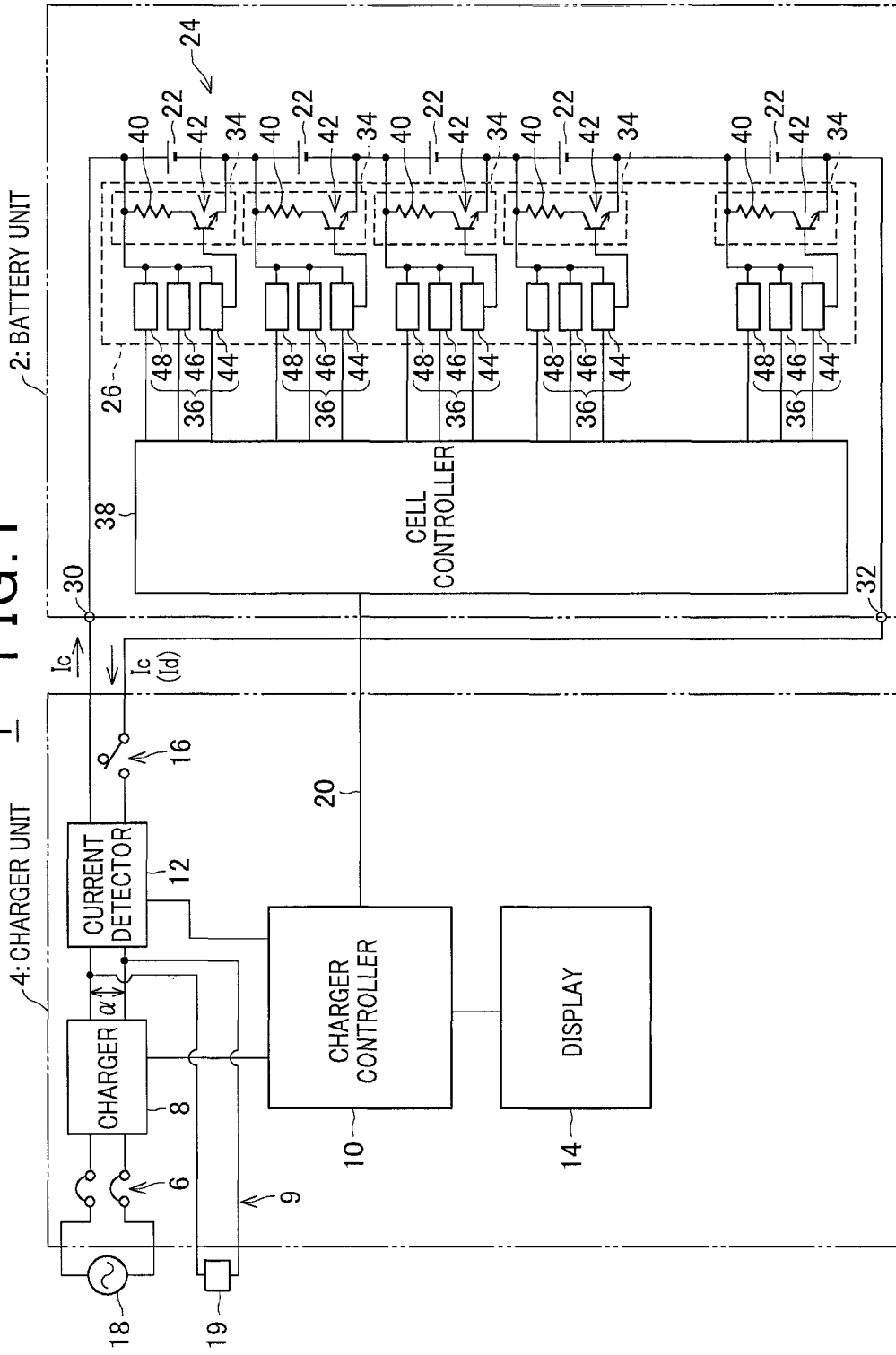
FIG. 1 is a diagram showing the construction of a charging apparatus according to a first embodiment of the present invention.

REFERENCE SIGNS LIST 1, 100 charging apparatus
2 battery unit
4 charger unit
8 charger
9 parallel circuit
10 charger controller (charging control means)
12 current detector
14 display
19 external load
22, 22A, 22B, 122 secondary cell
24 cell group
26 overcharge protection circuit
34 discharge route circuit
38 cell controller
40 discharge resistor
42 switching element
44 overcharge protection detector
46 charge end detector
48 discharge cut-off detector
50 gas generation detector
Ic charging current
Ith lower limit charging current value
Vb battery voltage
Vm full charge voltage
Vth1 overcharge protection voltage
Vth2 protection stop voltage
Vth3 charge end voltage
Vth4 discharge cut-off voltage

DETAILED DESCRIPTION OF THE INVENTION

Description of Embodiments
Hereinafter, embodiments of the present invention are described with reference to the drawings.
<First Embodiment>
FIG. 1 is a diagram showing the construction of a charging apparatus 1 according to this embodiment. As shown in FIG. 1, the charging apparatus 1 is provided with a battery unit 2 for storing power and a charger unit 4 for charging the battery unit 2 by supplying power thereto.

The charger unit 4 includes an external power connector 6, a charger 8, a charger controller 10, a current detector 12, a display 14 and a cut-off switch 16.

The external power connector 6 is a connector connected to an external power supply 18 such as a commercial power supply, and power of the external power supply 18 is input to the charger 8.

The charger 8 charges the battery unit 2 and drives an external load 19 by supplying the power of the external power supply 18 to the battery unit 2 and the external load 19. This external load 19 is a device which receives the supply of stored power of the battery unit 2 during the power stoppage of the external power supply 18.

More specifically, the battery unit 2 and the external load 19 are connected in parallel to the charger 8, and a parallel circuit 9 is formed by these battery unit 2 and external load 19. The charger 8 supplies a DC charging current Ic to the battery unit 2 and supplies power to the external load 19 by applying a voltage α to this parallel circuit 9.

When the power stoppage of the external power supply 18 occurs, the charger 8 enters a high-impedance state when viewed from the parallel circuit 9 composed of the battery unit 2 and the external load 19, wherefore the battery unit 2 and the external load 19 are automatically connected in series and stored power is supplied from the battery unit 2 to the external load 19.

The charger controller 10 variably controls a current value of the charging current Ic during charging and is connected to the battery unit 2 via a signal line 20. The charger controller 10 controls the charging current Ic based on a signal received from the battery unit 2 via this signal line 20.

The current detector 12 is disposed in a series circuit connecting the charger 8 and the battery unit 2, detects the charging current Ic flowing from the battery unit 2 toward the charger 8 and a discharging current Id flowing from the charger 8 according to discharge and outputs to the charger controller 10.

The charger controller 10 variably controls the current value of the charging current Ic based on a detection signal of the current detector 12. The charger controller 10 also takes and samples the detection signal of the current detector 12 at intervals of a preset time and adds the sampled charging currents Ic to calculate a charge amount Wc during a charging period, and adds the sampled discharging currents Id to calculate a discharge amount Wd during a discharging period.

The charger controller 10 calculates a present storage amount W of the battery unit 2 based on the thus calculated charge amount Wc and discharge amount Wd. In other words, if an initial capacity W0 denotes a capacity in a state where the battery unit 2 is fully charged, the present storage amount W is calculated by $W=W0-Wd+Wc$.

The display 14 displays various pieces of information, for example, a calculated value of the present storage amount W of the battery unit 2 under the control of the charger controller 10.

Further, the charger controller 10 has a function of counting a charge number as the number of times the battery unit 2 is charged, calculates a ratio of the present charge number to a specified charge number indicating the life of a cell group 24 (to be described later) of the battery unit 2 and displays this ratio as information indicating how far the life of the cell group 24 has been consumed on the display 14.

The cut-off switch 16 is a constantly closed switch for stopping the discharge of the battery unit 2, disposed in the series circuit connecting the charger 8 and the battery unit 2, and opened to prevent overdischarge of the battery unit 2 when the battery unit 2 supplies power to the external load 19 under the control of the charger controller 10. In this way, discharge accompanying power supply from the battery unit 2 to the external load 19 or the like is stopped to prevent overdischarge.

Since the cut-off switch 16 is the constantly closed switch, an electrically conductive state is normally maintained in between the battery unit 2 and the external load 19. Since the electrically conductive state is constantly kept in between the battery unit 2 and the external load 19 without being cut off by a switch or the like, even if the power stoppage of the external power supply 18 occurs, a situation is prevented in which this switch does not operate due to stopped power supply and the battery unit 2 and the external load 19 are left cut off.

However, if the electrically conductive state is constantly maintained in between the battery unit 2 and the external load 19, the stored power of the battery unit 2 is supplied to the external load 19 while the battery unit 2 is not being charged. Accordingly, the charging apparatus 1 prevents power from being supplied from the battery unit 2 to the external load 19 and unnecessarily discharged by carrying out zero current charging for maintaining the charging current Ic flowing into the battery unit 2 substantially at zero during non-charging periods.

Specifically, during non-charging periods, the charger controller 10 feedback controls the voltage α applied to the parallel circuit 9 based on a detection value of the current detector 12 so that the charging current Ic flowing into the battery unit 2 is maintained substantially at zero. As a result, the differential voltage between the voltage α and the voltage of the battery unit 2 becomes substantially equal, and the charging current Ic to the battery unit 2 becomes substantially zero, and this state is held to hold the supply of the stored power from the battery unit 2 to the external load 19 in a stopped state.

Next, the construction of the battery unit 2 is described in detail.

The battery unit 2 includes the cell group 24 composed of n secondary cells 22 connected in series, and an overcharge protection circuit (balancing circuit) 26. The secondary cells 22 are, for example, lithium polymer cells as an example of lithium ion cells. Besides, it is possible to use arbitrary secondary cells such as nickel hydrogen cells and nickel cadmium cells. However, all the secondary cells 22 constituting the cell group 24 are secondary cells of the same type.

The battery unit 2 includes an anode terminal 30 electrically connected to an anode of the cell group 24 and a cathode terminal 32 electrically connected to a cathode of the cell group 24, and these anode terminal 30 and cathode terminal 32 are electrically connected to the charger unit 4. During charging periods, the charging current Ic is supplied from the charger unit 4 to the cell group 24 via the anode terminal 30 to charge the cell group 24.

The overcharge protection circuit 26 protects overcharge of the secondary cells 22 by aligning voltage balances among the secondary cells 22 and includes discharge route circuits 34 provided in parallel to each of the respective secondary cells 22, detector groups 36 provided to each of the respective secondary cells 22 and a cell controller 38.

Each discharge route circuit 34 is a circuit connecting a discharge resistor (balancing resistor) 40 and a switching element 42 in series in its path. The switching element 42 is a constantly open contact and closed when a cell voltage Vb of the secondary cell 22 reaches an overcharge protection voltage Vth1. This overcharge protection voltage Vth1 is set to be lower than a full charge voltage Vm according to the type of the secondary cell 22 and does not exceed 4.2 V at which a fully charged state is, for example, assumed in the case of a lithium polymer cell.

When the switching element 42 is closed, the discharge route circuit 34 is electrically connected to the secondary cell 22 that starts discharging to the discharge route circuit 34. During discharge to the discharge route circuit 34, the cell voltage Vb of the secondary cell 22 gradually decreases due to energy release by discharge, a reduction in flowing amount of the charging current Ic into the secondary cell 22 because of bypass of the charging current Ic to the discharge route circuit 34 or the like. When the cell voltage Vb decreases to a protection stop voltage Vth2 lower than the overcharge protection voltage Vth1 by a specified margin, the switching element 42 is opened to stop discharge to the discharge route circuit 34. During charging periods, transition is made to a charging state again. A difference between the overcharge protection voltage Vth1 and the protection end voltage Vth2 is set at such a value as to be able to prevent at least chattering of the switching element 42.

During discharge of the secondary cell 22, the charging current Ic flowing into this secondary cell 22 is bypassed to the discharge route circuit 34 to be introduced to the secondary cell 22 at a later stage. At this time, a value of the bypassed current is determined by a resistance value of the discharge resistor 40.

A detector group 36 includes an overcharge protection detector 44, a charge end detector 46 and a discharge cut-off detector 48. These overcharge protection detector 44, charge end detector 46 and discharge cut-off detector 48 form a comparator for comparing the cell voltage Vb of the secondary cell 22 with a specified voltage set for each secondary cell 22.

The overcharge protection detector 44 detects the cell voltage Vb of the secondary cell 22, compares this cell voltage Vb and the above overcharge protection voltage Vth1 and causes the secondary cell 22 to discharge to the discharge route circuit 34 by closing the switching element 42 when the cell voltage Vb exceeds the overcharge protection voltage Vth1. The overcharge protection detector 44 also stops discharge of the secondary cell 22 to the discharge route circuit 34 by opening the switching element 42 when the cell voltage Vb falls below the protection end voltage Vth2.

Further, the overcharge protection detector 44 outputs to the cell controller 38 an open/close signal indicating a closed/closed state of the switching element 42, i.e. start/stop of discharge every time the switching element 42 is opened or closed. Upon receiving such an open/close signal, the cell controller 38 outputs the open/close signal to the charger controller 10 of the charger unit 4 via the signal line 20, whereby the charger controller 10 can detect the presence or absence of discharge to the discharge route circuit 34.

The charger controller 10 performs such a control as to reduce the charging current Ic until discharge to the discharge route circuit 34 is stopped when detecting based on the open/close signal during a charging period that any one of the secondary cells 22 starts discharge to the discharge route circuit 34. Such a control is described later.

The charge end detector 46 detects the cell voltage Vb of the secondary cell 22 and outputs this detection signal to the cell controller 38. The cell controller 38 adds the cell voltages Vb of the respective secondary cells 22 to calculate a voltage Vall of the cell group 24 and outputs the calculated voltage Vall to the charger controller 10 via the signal line 20. The charger controller 10 sets the above zero current charging state to stop charging to the battery unit 2 by controlling the voltage α applied to the parallel circuit 9 including the battery unit 2 such that the charging current Ic flowing into the battery unit 2 becomes substantially zero when the voltage Vall of the cell group 24 reaches a specified charge end voltage Vth3. The charge end voltage Vth3 is a value obtained by multiplying the full charge voltage Vm of the secondary cell 22 by the number of the secondary cells 22.

Charging of the battery unit 2 is quickly stopped also when the cell voltage Vb of any one of the secondary cells 22 reaches an upper limit value of permitted voltages.

The discharge cut-off detector 48 detects the cell voltage Vb of the secondary cell 22 and compares this cell voltage Vb and a discharge cut-off voltage Vth4 while the cell group 24 is not being charged, i.e. while the stored power of the cell group 24 is supplied to the external load 19, and outputs a detection signal to the cell controller 38 when the cell voltage Vb falls below the discharge cut-off voltage Vth4. The discharge cut-off voltage Vth4 is designed to prevent the secondary cell 22 from entering a state where the secondary cell 22 discharges beyond an end voltage, i.e. an overdischarge state and set at a voltage above the end voltage. For example, if the secondary cell 22 is a lithium polymer cell, the discharge cut-off voltage Vth4 is set at about 3 V.

The cell controller 38 outputs a cut-off signal, which indicates that discharge should be cut off, to the charger controller 10 via the signal line 20 when receiving the detection signal from any one of the discharge cut-off detectors 48. The charger controller 10 opens the cut-off switch 16 when receiving the cut-off signal from the cell controller 38. In this way, discharge caused by power supply from the battery unit 2 to the external load 19 or the like is stopped.

Note that this charging apparatus 1 includes a temperature detection sensor such as a thermistor for detecting a cell temperature of the cell group 24 and stops charging when the temperature of the cell group 24 exceeds a specified temperature (e.g. 60° C. in lithium polymer cells) during charging periods.

Next, a charging control of the charging apparatus 1 is described.

Figure 2:
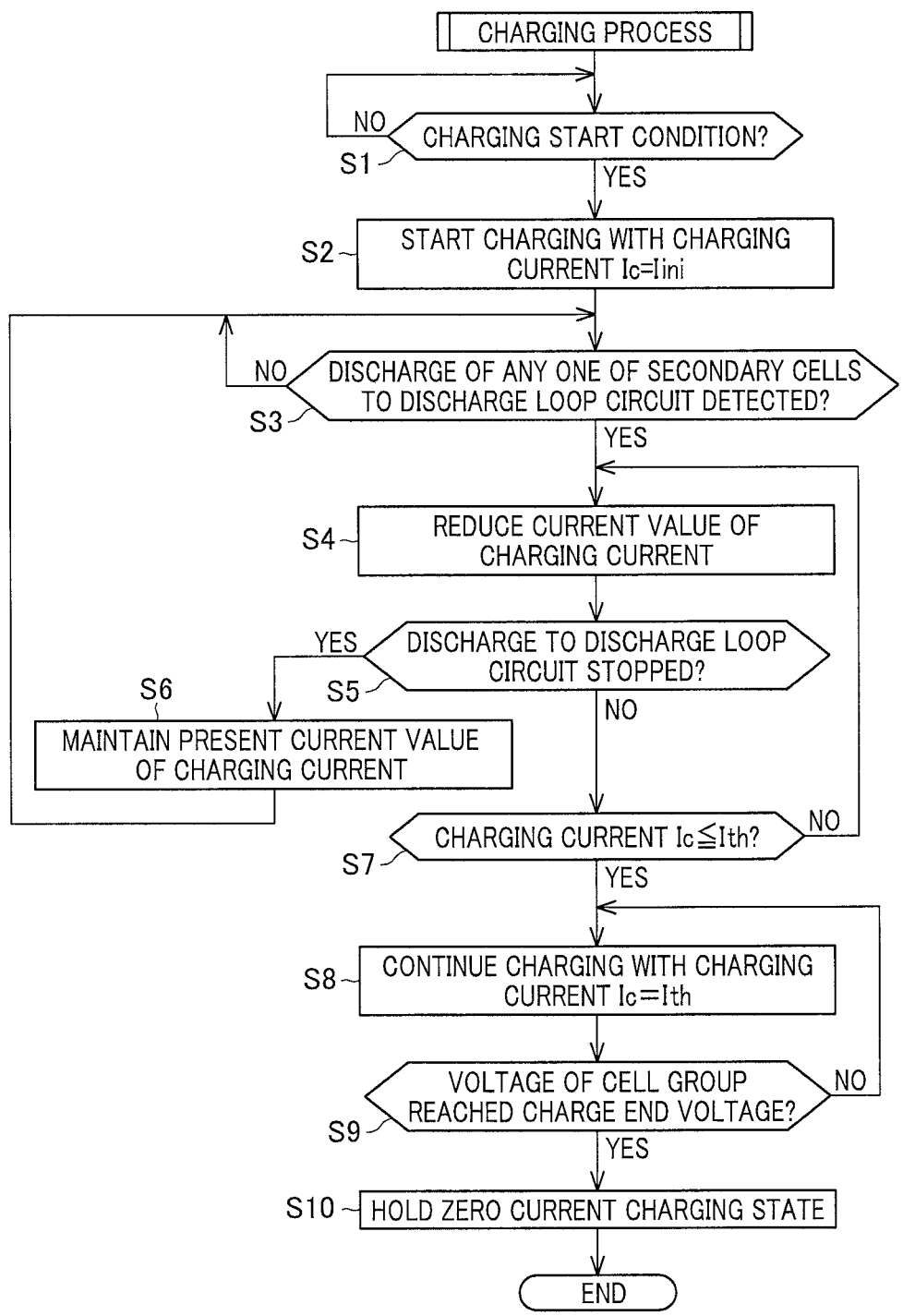
FIG. 2 is a flow chart of a charging process.
Figure 3:
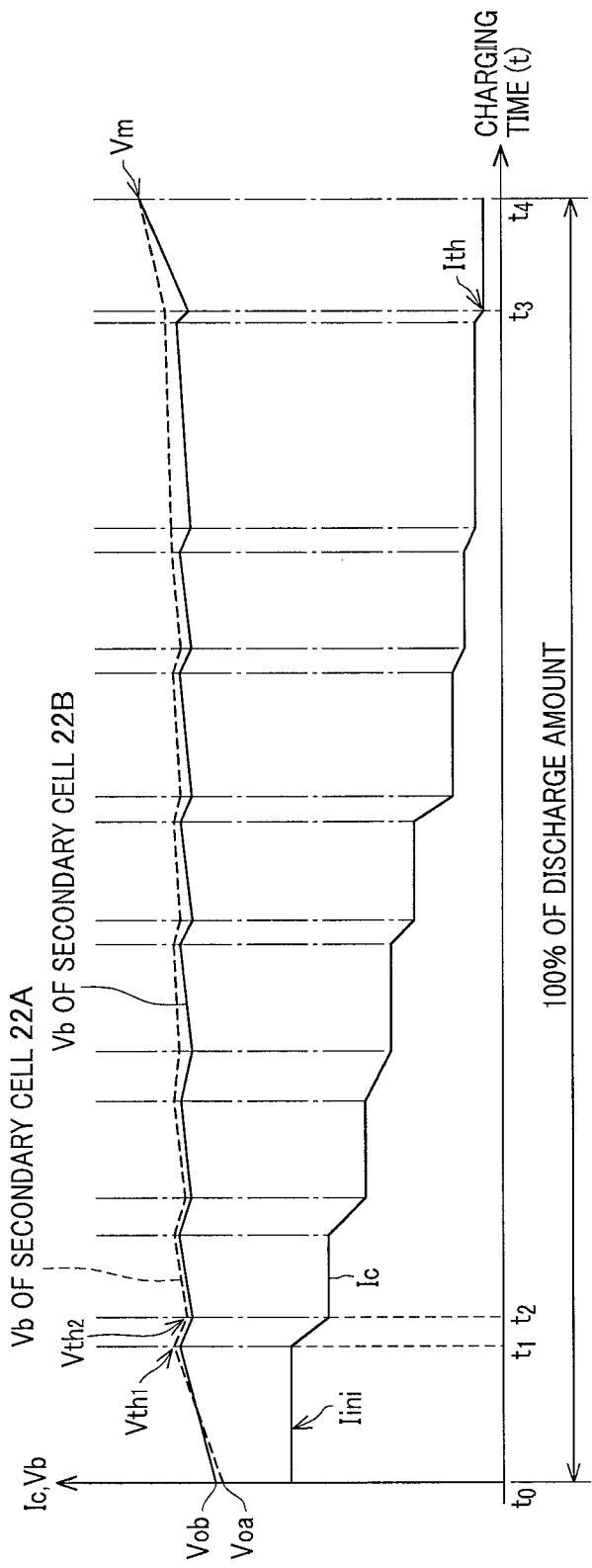
FIG. 3 is a chart showing charging patterns.

FIG. 2 is a flow chart showing a charging process of the charging apparatus 1, and FIG. 3 is a chart showing charging patterns by the charging apparatus 1. Note that FIG. 3 shows charging patterns of two secondary cells 22A, 22B having different cell voltage rising characteristics during charging periods.

The charging apparatus 1 first judges whether or not charging start conditions have been satisfied in the case of charging (Step S1). Various conditions, for example, a condition that the cell group 24 is no longer in the fully charged state, a condition that the cut-off switch 16 is opened to prevent overcharge and a condition that a specified period has elapsed after the completion of the previous charging are set as the charging start conditions.

When the charging start conditions are satisfied (Step S1: YES), the charging apparatus 1 starts charging by supplying the charging current Ic having a current value Iini to the battery unit 2 (Step S2). Namely, the charging apparatus 1 adjusts the voltage α applied to the cell group 24 so that the current value of the charging current Ic becomes the current value Iini while sampling the detection signal by the current detector 12. As shown in FIG. 3, when the supply of the charging current Ic is started to start charging (time t0), the cell voltages Vb of the respective secondary cells 22A, 22B of the cell group 24 start rising from charge initial voltages V0a, V0b.

For example, if the secondary cell 22A has such a characteristic that the cell voltage Vb more easily rises than the secondary cell 22B as shown in FIG. 3, the cell voltage Vb of the secondary cell 22A reaches the overcharge protection voltage Vth1 (time t1) before the cell voltage Vb of the secondary cell 22B reaches the overcharge protection voltage Vth1. As a result, the overcharge protection detector 44 of the secondary cell 22A closes the switching element 42 to prevent the secondary cell 22A from being overcharged, thereby connecting the secondary cell 22A to the discharge route circuit 34 to start discharge. When the overcharge protection detector 44 closes the switching element 42, an open/close signal is output to the charge controller 10, whereby discharge of the secondary cell 22A to the discharge route circuit 34 is detected by the charge controller 10.

As shown in FIG. 2, when detecting discharge of any one of the secondary cells 22 to the discharge route circuit 34 (Step S3: YES), the charge controller 10 successively reduces the current value of the charging current Ic (Step S4).

In this way, as shown in FIG. 3, the current value of the charging current Ic is reduced from time t1 when the cell voltage Vb of the secondary cell 22A reaches the overcharge protection voltage Vth1.

The cell voltage Vb of the secondary cell 22A is gradually reduced according to discharge to the discharge route circuit 34 and a decrease of the charging current Ic and, when the cell voltage Vb falls to the protection end voltage Vth2 (time t2), the overcharge protection detector 44 of the secondary cell 22A opens the switching element 42 to stop discharge of the secondary cell 22A to the discharge route circuit 34. This stop of the discharge to the discharge route circuit 34 is detected by the charge controller 10 by the output of the open/close signal to the charge controller 10.

As shown in FIG. 2, when detecting the stop of the discharge of the secondary cell 22 to the discharge route circuit 34 (Step S5: YES), the charge controller 10 stops reducing the current value of the charging current Ic and fixes the current value at a present value (Step S6) and continues charging by returning a process procedure to Step S3.

In this way, as shown in FIG. 3, the charging current Ic is fixed at a current value reached when the charging current Ic decreases until the cell voltage Vb of the secondary cell 22A falls to the protection stop voltage Vth2 to stop the discharge. Note that not only the cell voltage Vb of the secondary cell 22A, but also that of the other secondary cell 22B are reduced as the charging current Ic is reduced.

Thereafter, a process of reducing the charging current Ic until the discharge of the secondary cell 22 to the discharge route circuit 34 is stopped is repeatedly performed every time the discharge of any one of the secondary cells 22 to the discharge route circuit 34 is detected. This repeat count changes according to a difference in the voltage rising characteristic during the charging, a degree of deterioration and the like of the secondary cells 22, and the process is not constantly repeated by a fixed number of times.

At a charge final stage where the respective secondary cells 22 approach the fully charged state, the charging current Ic decreases and falls below a lower limit charging current value Ith (time t3) when being reduced by the process of the above Step S4 as shown in FIG. 3. This lower limit charging current value Ith is set at a specified current value, which the respective secondary cells 22 indicate when approaching the fully charged state.

As shown in FIG. 2, when detecting that the charging current Ic fell to or below the lower limit charging current value Ith (Step S7: YES), the charge controller 10 continues charging while maintaining the charging current Ic at the lower limit charging current value Ith (Step S8).

As a result, the charged states of the respective secondary cells 22 approach the fully charged state, the cell voltages Vb exceed the overcharge protection voltage Vth1 and the discharge to the discharge route circuit 34 is started in many of the secondary cells 22. Since the charging current Ic is a very small value at this time, the values of the currents bypassed to the discharge route circuits 34 are also small and energy losses in the discharge resistors 40 are also small. Even into the secondary cell 22 discharging to the discharge route circuit 34, a small current, which was not bypassed to the discharge route circuit 34, out of the charging current Ic flows and the cell voltage Vb reaches the full charge voltage Vm beyond the overcharge protection voltage Vth1 (time t4) as shown in FIG. 3.

When the voltage Vall of the cell group 24 reaches the above charge end voltage Vth3 in this way (Step S9: YES), about 100% of the discharge amount Wd has been charged from the start of charging (time t0). Accordingly, the charging apparatus 1 sets the charging state of the battery unit 2 at the above zero current charging state to stop charging the battery unit 2 (Step S10), thereby ending the charging process.

In this zero current charging, the voltage α of the charger 8 is feedback controlled so that the charging current Ic flowing into the battery unit 2 is maintained substantially at zero. In this way, the charging of the battery unit 2 is stopped and the supply of the stored power from the battery unit 2 to the external load 19 is held in the stopped state while the battery unit 2 and the external load 19 are held in the electrically conductive state.

As described above, according to this embodiment, the charger controller 10 continues charging while reducing the charging current Ic until the discharge of the secondary cell 22 having started discharge to the discharge route circuit 34 is stopped when any one of the secondary cells 22 starts discharging to the discharge route circuit 34 by an overcharge protection operation of the overcharge protection circuit 26.

By this construction, the discharges of the respective secondary cells 22 to the discharge route circuits 34 are suppressed during charging, wherefore charging power is not wasted by discharge and charging efficiency is improved.

In addition, since heat generation in the discharge route circuits 34 is also reduced, deterioration of peripheral components is also prevented.

Further, according to this embodiment, the charger controller 10 continues the supply to the cell group 24 with the charging current Ic maintained at the specified lower limit charging current value Ith when the charging current Ic falls below this lower limit charging current value Ith, and stops charging when the voltage Vall of the cell group 24 reaches the specified charge end voltage Vth3.

By this construction, the supply to the cell group 24 is continued with the charging current Ic maintained at the lower limit charging current value Ith, whereby the cell voltages Vb of many of the secondary cells 22 exceed the overcharge protection voltage Vth1 to start discharging to the discharge route circuits 34. However, since the charging current Ic has the relatively small lower limit charging current value Ith, energy consumed by the discharge route circuits 34 is also suppressed to a low level. The respective secondary cells 22 can be charged up to the full charge voltage Vm with an energy amount consumed by the discharge route circuits 34 suppressed in this way.

Further, according to this embodiment, the parallel circuit 9 is composed of the cell group 24 and the external load 19 and connected to the charger 8. Thus, the cell group 24 and the external load 19 are held in the electrically connected state during non-charging periods. Therefore, such as in the case of power stoppage of the external power supply 18 for supplying power to the charger 8, the cell group 24 and the external load 19 automatically form the series circuit to quickly start the supply of stored power from the cell group 24 to the external load 19.

Further, during non-charging periods, the voltage α applied to the parallel circuit 9 by the charger 8 is controlled to maintain the charging current Ic flowing into the cell group 24 substantially at zero, wherefore no power is supplied from the cell group 24 to the external load 19, thereby preventing unnecessary discharge of this cell group 24.

Further, according to this embodiment, the supply of the stored power from the cell group 24 to an external device is cut off and charging of the cell group 24 is started when the cell voltage Vb of any one of the secondary cells 22 falls to the specified discharge cut-off voltage Vth4, wherefore overcharge of each secondary cell 22 can be reliably prevented.

<Second Embodiment>

Next, a second embodiment of the present invention is described. In this embodiment is described a charging apparatus 100 for charging a cell group 124 in which a plurality of secondary cells 122 having a property of generating gas during charging are connected in series.

Figure 4:
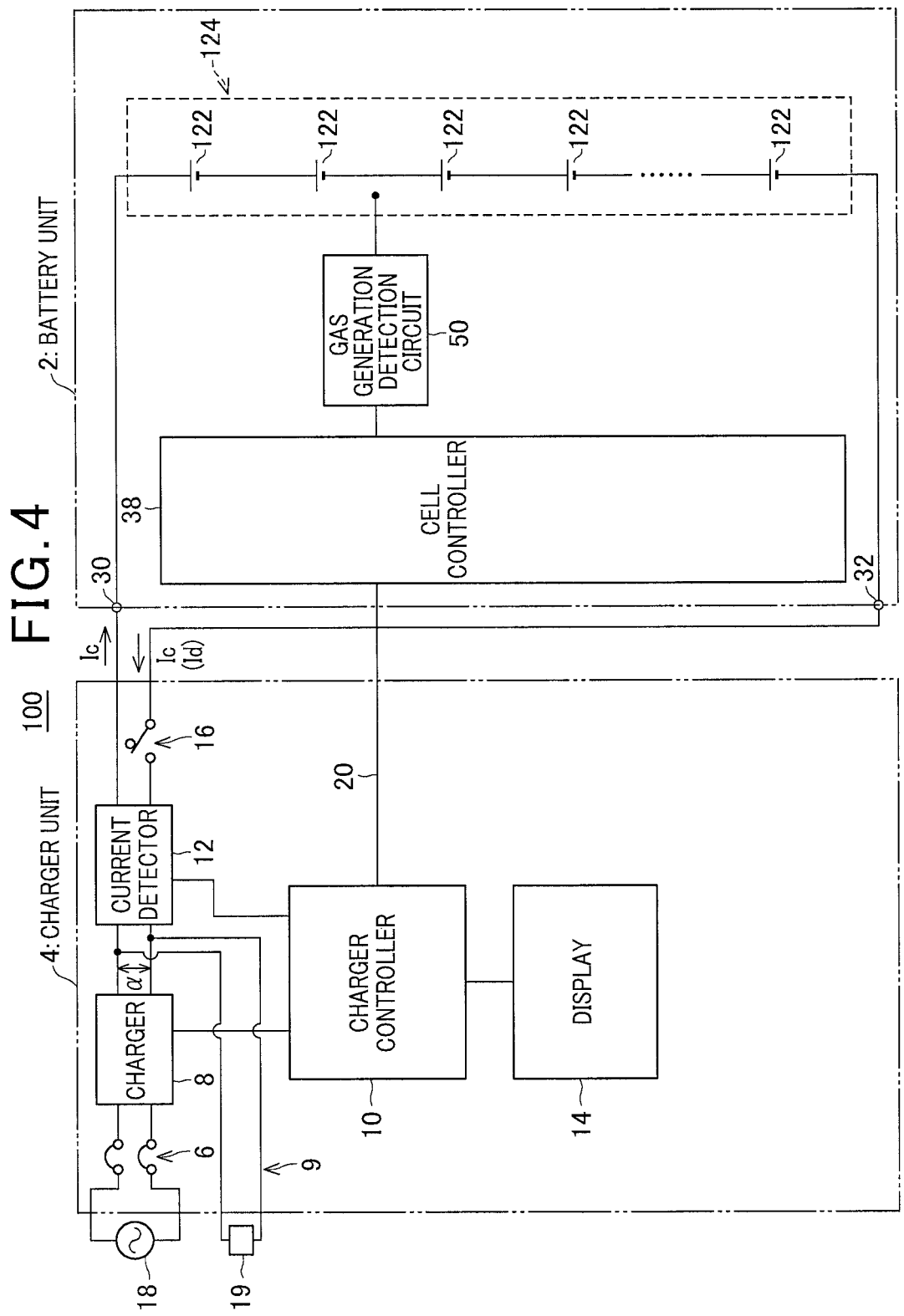
FIG. 4 is a diagram showing the construction of a charging apparatus according to a second embodiment.

FIG. 4 is a diagram showing the construction of the charging apparatus 100 according to this embodiment. Note that the parts shown in FIG. 1 are denoted by the same reference numerals in FIG. 4 and not described.

As shown in FIG. 4, the charging apparatus 100 of this embodiment includes a gas generation detection circuit 50. This gas generation detection circuit 50 detects gas generation in any one of the secondary cells 122 and outputs to a cell controller 38. The cell controller 38 outputs to a charger controller 10 via a signal line 20 in the case of detecting gas generation.

The charger controller 10 continues charging while reducing a charging current Ic until gas generation is stopped every time gas generation is detected during charging.

When the charging current Ic falls below a lower limit charging current value Ith, a process similar to that after Step S7 of FIG. 2 described in the first embodiment is performed. Namely, when detecting that the charging current Ic fell to or below the lower limit charging current value Ith (Step S7: YES), the charger controller 10 continues charging while maintaining the charging current Ic at the lower limit charging current value Ith (Step S8).

When a voltage Vall of the cell group 124 reaches a charge end voltage Vth3 described above (Step S9: YES), the charger controller 10 stops charging while setting a charging state of the battery unit 2 at a zero current charging state (Step S10), thereby ending the charging process.

As described above, according to this embodiment, an increase in internal resistance of each secondary cell 122 is suppressed since gas generation in the secondary cell 122 is suppressed during charging. Thus, waste of charging power accompanying this increase in internal resistance is suppressed and charging efficiency is improved.

The gas generation detection circuit 50 may directly detect whether or not gas is being generated using a gas sensor or the like or may monitor the cell voltage Vb of each secondary cell 122 and indirectly detect gas generation by detecting that the cell voltage Vb has reached a specified voltage at which gas is generated from the secondary cell 122.

Further, if the gas generation detection circuit 50 directly detects whether or not gas is being generated using a sensor or the like, the charger controller 10 may judge the stop of the gas generation based on a detection result of this gas generation detection circuit 50 or may indirectly detect the stop of the gas generation by comparing a specified cell voltage at which gas generation is stopped and the cell voltage Vb of the secondary cell 122.

The above embodiments are to be understood as illustrative examples of the present invention and can be arbitrarily modified and applied within the scope of the present invention.

For example, overconsumption of charging power in the overcharge protection circuit 26 during charging and overconsumption of charging power accompanying gas generation in the secondary cells 122 during charging are suppressed in the above embodiments.

However, without being limited to this, if a cell group could cause a power consumption factor for unnecessarily consuming charging power other than for charging and this power consumption factor could be solved by reducing a charging current, the present invention can also be applied to charge such a cell group.

Namely, in the case of power consumption caused by the power consumption factor during charging, charging may be continued with the charging current reduced until this consumption is stopped.

The invention claimed is:

1. A charging apparatus for charging a cell group, in which a plurality of secondary cells are connected in series, by supplying a charging current to the cell group, comprising:
    a gas generation detection circuit that detects gas generation from any one of the secondary cells while the cell group is being charged; and
    a charging controller that performs a process of continuous charging while reducing the charging current when gas generation is detected in any one of the secondary cells until the gas generation of the secondary cell is stopped, fixing the charging current at a current value reached when the gas generation is stopped, and repeats the process until the charging current reaches a predetermined lower limit charging current value.

2. The charging apparatus according to claim 1, further comprising a charger for supplying external power to a parallel circuit, in which the cell group and an external load are connected in parallel, charging the cell group and supplying power to the external load, wherein:
    a voltage applied to the parallel circuit by the charger is controlled to maintain the charging current flowing into the cell group substantially at zero during non-charging periods while the cell group and the external load are maintained in an electrically conductive state.

3. The charging apparatus according to claim 1, wherein when the charging current reaches the predetermined lower limit charging current value, the charging controller continues charging while maintaining the charging current at the lower limit charging current value, and stops charging when a voltage of the cell group reaches a predetermined charge end voltage.

4. A charging method for charging a cell group, in which a plurality of secondary cells are connected in series, by supplying a charging current to the cell group, comprising the steps of:
    detecting gas generation from any one of the secondary cells while the cell group is being charged;
    performing a process of continuous charging while reducing the charging current when gas generation is detected in any one of the secondary cells until the gas generation of the secondary cell is stopped;
    fixing the charging current at a current value reached when the gas generation is stopped; and
    repeating the process until the charging current reaches a predetermined lower limit charging current value.

5. The charging method according to claim 4, wherein when the charging current reaches the predetermined lower limit charging current value, the charging continues while the charging current is maintained at the lower limit charging current value, and stops when a voltage of the cell group reaches a predetermined charge end voltage.

* * * * *